June 24, 1930.  C. A. RINKER  1,766,307
DRIVE MECHANISM
Filed Oct. 19, 1928   2 Sheets-Sheet 2
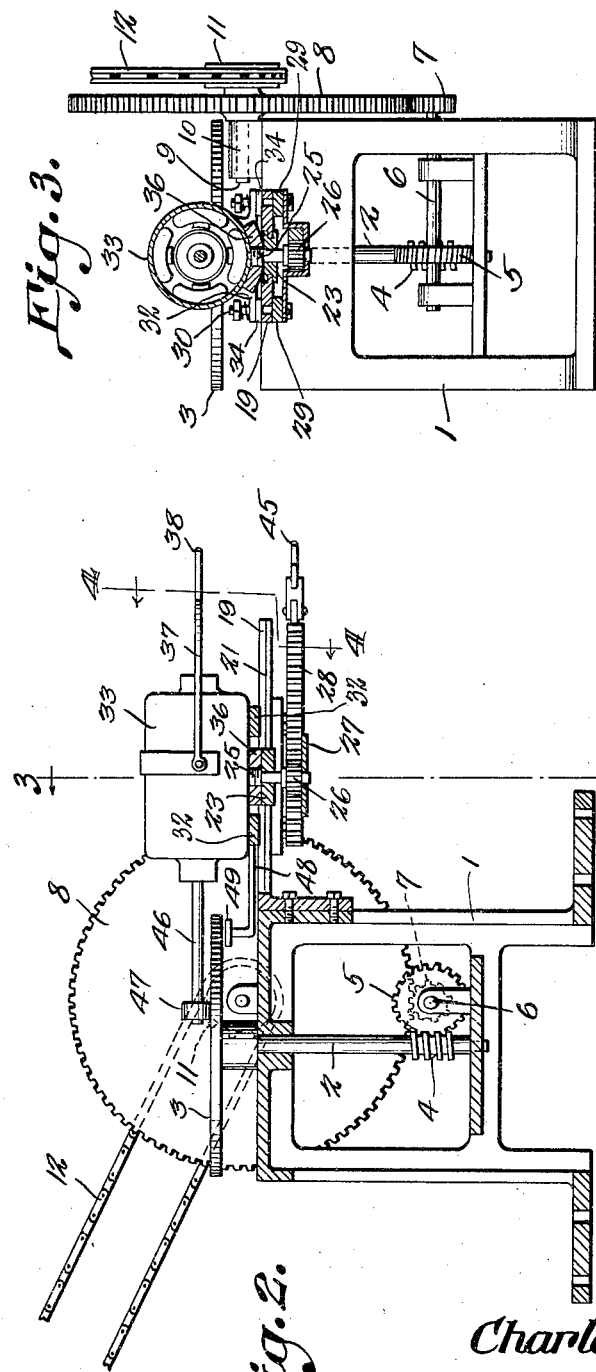
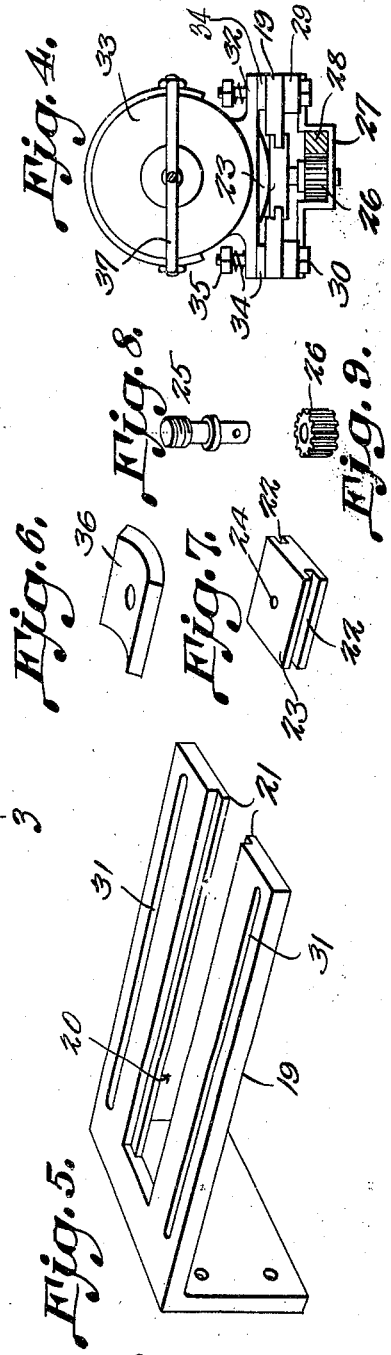
Charles A. Rinker, Inventor Patented June 24, 1930

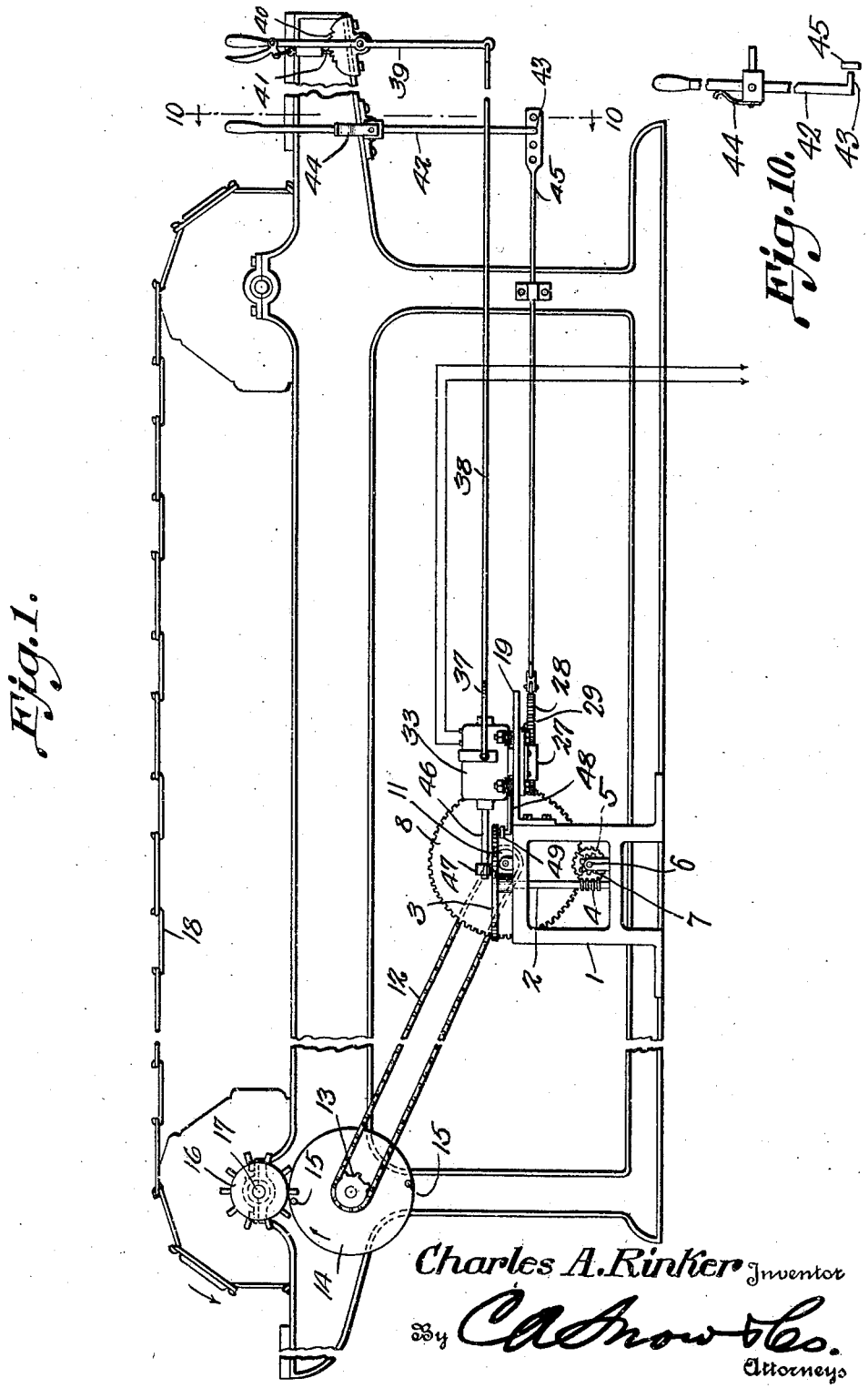

1,766,307

UNITED STATES PATENT OFFICE

CHARLES A. RINKER, OF GALESBURG, ILLINOIS

DRIVE MECHANISM

Application filed October 19, 1928. Serial No. 313,519.

This invention relates to drive mechanism designed primarily for use in connection with bunch forming machines such as shown, for example, in Patent 1,631,760 issued to me on June 7, 1927, although the mechanism can be used with other types of machines.

One of the objects of the invention is to simplify a drive mechanism of the change-speed type by providing a means whereby the driving motor and its pully shaft can be shifted bodily relative to the driven mechanism to vary the speed or to stop and start the mechanism without stopping the motor.

With the foregoing and other objects in view which will appear as the description proceeds the invention resides in the combination and arrangement of parts and in the details of construction hereinafter described and claimed it being understood that changes in the precise embodiment of the invention herein disclosed may be made within the scope of what is claimed without departing from the spirit of the invention.

In the accompanying drawings the preferred form of the invention has been shown.

In said drawings,

Figure 1 is a side elevation of a portion of a machine having the present improvements combined therewith.

Figure 2 is an enlarged vertical longitudinal section through that portion of the drive mechanism constituting the present invention.

Figure 3 is a section on line 3—3, Figure 2.

Figure 4 is a section on line 4—4, Figure 2.

Figure 5 is a perspective view of the supporting bracket.

Figure 6 is a perspective view of the motor rest or saddle.

Figure 7 is a perspective view of the slide.

Figure 8 is a perspective view of the lifting screw.

Figure 9 is a detail view of the gear carried by said screw.

Figure 10 is a section on line 10—10, Figure 1.

Referring to the figures by characters of reference, 1 designates the supporting frame of the mechanism in which is journaled a vertical shaft 2 having a friction disk 3 at its upper end and a drive worm 4. This worm meshes with a gear 5 secured to a shaft 6 to which is fastened a smaller gear 7. This gear meshes with a larger gear 8 the shaft 9 of which is journaled in a bearing 10. A sprocket 11 rotates with gear 8 and is adapted to transmit motion through a chain 12 to a sprocket 13 which rotates with a disk 14. This disk has spaced laterally extending pins 15 adapted to engage and rotate a pin tooth gear 16 secured to one of the shafts 17 of an endless conveyor 18 or the like. Obviously rotation of the disk 3 will result in the transmission of an intermittent motion to shaft 17 after an interval of predetermined duration, when one pin only is used on disk 14. Likewise an increase of motion can be given shaft 17 by the use of more pins on disk 14 without changing the speed of disk 3, thereby increasing the pull or power of the motor. By using enough pins on disk 14 to mesh continuously with pin gear 16, continuous motion would result and under these conditions a speed change could be effected by moving the motor hereinafter referred to radially relative to disk 3, as will be explained.

Secured to the frame 1 is a supporting bracket 19 having a longitudinal slot 20 the walls of which are provided with supporting ribs 21 adapted to extend into grooves 22 in the sides of a slide 23. This slide has an opening 24 extending therethrough for receiving the shank or unthreaded portion of a lifting screw 25 to the lower end of which is secured a gear 26. The lower portion of the screw is journaled in a cross strip 27 which is offset downwardly to receive the gear 26 and to receive and support a rack 28 mounted to slide on the strip.

The ends of the strip 27 are attached to parallel side bars 29 arranged longitudinally beneath the sides of the bracket 19 and supported by bolts 30 extending upwardly through longitudinal slots 31 in the bracket 19. These bolts also extend through bolsters 32 which normally support an electric motor 33. Resilient members consisting of metal springs or rubber sleeves 34 are mounted on the bolts 30 both above and below the motor feet and nuts 35 which engage the bolts serve to hold the bolts and resilient members properly assembled. A saddle 36 is interposed between the bottom of the motor 33 and has a threaded opening to receive the upper end of screw 25.

For the purpose of shifting the motor longitudinally there is provided a yoke 37 which straddles and is pivotally connected to the motor and has a rod 38 attached to a controlling lever 39. A toothed segment 40 and a pawl 41 can be used for holding this lever against movement. Another controlling lever 42 adapted to swing laterally as well as back and forth, is detachably connected at 43 to a rod 45 extending from the rack 28. A spring 44 holds the lever normally disengaged from the rod. The motor shaft 46 has a friction wheel 47 secured thereto and when the motor is in its lowermost position resting on the resilient members between the motor and the bracket 19, this wheel contacts with the friction disk 3 so as to drive it. An arm 48 is extended from the motor and has a brake shoe 49 attached to it and located below but normally out of contact with the disk 3. The most apparent need for the resilient members between the motor and the bracket 19 is mainly to eliminate noise and vibration. For this reason it is generally preferred to use rubber sleeves or cylinders in preference to springs. These lower springs, moreover, assist in holding the motor in a firm position.

In using the apparatus described lever 42 is shifted in one direction so as to cause the rack to rotate gear 26 and feed the screw 25 upwardly into saddle 36. By this operation the motor is lowered and the friction wheel is brought in contact with disk 3. When the lever 42 is shifted in the opposite direction the motor 33 will be raised against the action of the springs 34 and the friction wheel 47 is lifted out of contact with the disk 3. By shifting lever 39 the motor can be moved longitudinally to bring the wheel 47 to any desired position relative to disk 3 in order to drive the mechanism at a predetermined speed. During this adjustment the lever 42 is left free to swing out of engagement with rod 45 due to the side action caused by spring 44 so as to allow rack 28 to travel with gear 26 without rotating it. After wheel 47 has been brought to selected position lever 39 is fastened against further movement and lever 42 is then shifted to rotate gear 26 and rotate the screw 25 in the saddle 36. Thus the motor will be lowered and wheel 47 brought into contact with disk 3. Whenever it is desired to stop the driven mechanism it is merely necessary to raise the motor as described to its uppermost position and this action will also bring shoe 49 against the disk 3 to stop it. Should disk 14 be equipped with enough pins to mesh continuously with gear 16, a change of speed could be effected by moving the motor 33 and the friction wheel 47 radially relative to disk 3. Should disk 14 be equipped for intermittent motion following predetermined intervals, intermediate speeds can be acquired by moving the motor and friction wheel radially relative to disk 3. These speeds can be a fraction of a second or more, either more or less than that determined by the pins on disk 14.

What is claimed is:

1. The combination with driven mechanism including a friction disk, of a guide bracket, a slide thereon, a motor movable with the slide, a friction wheel on the shaft of the motor for engaging the disk, a lifting screw carried by the slide, means under the control of an operator for rotating the screw to bodily raise or lower the motor relative to the slide, and means under the control of an operator for shifting the slide and the motor radially of the disk.

2. The combination with driven mechanism including a friction disk, of a guide bracket, a slide thereon, an electric motor movable with the slide, yielding means for holding the motor to the slide, a lifting screw carried by the slide, a gear rotatable therewith, a rack engaging the gear, means for actuating the rack to rotate the screw and raise or lower the motor relative to the slide, a friction wheel carried by the motor shaft and shiftable by the motor out of and into engagement with the disk, and means for shifting the slide and motor radially relative to the disk.

3. The combination with driven mechanism including a friction disk, of a supporting bracket, a motor slidable thereon, a slide, a lifting screw carried by the slide, means for rotating the screw to raise or lower the motor relative to the bracket, a brake member movable with the motor and extending under and close to the disk, and a friction wheel carried by the motor shaft and movable by the motor into and out of contact with the disk.

4. The combination with driven mechanism including a friction disk, of a slotted bracket, a slide thereon, a motor extending over the slide and movable on the bracket, bars beneath the bracket and yieldingly connected to the motor, a saddle above the slide engaging the motor, a lifting screw engaging the saddle and carried by the slide, rack and gear mechanism for actuating the screw to raise or lower the motor relative to the bracket, a brake shoe connected to the motor and supported beneath the disk, a friction wheel carried by the motor shaft and above the disk, said shoe and gear adapted to alternately engage the disk during the raising and lowering of the motor respectively, and means for shifting the slide and motor radially of the disk.

5. The combination with driven mechanism including a friction disk, of a guide, a slide thereon, a motor movable with the slide, a friction wheel on the shaft of the motor for engaging the disk, a lifting element carried by the slide, means under the control of an operator for actuating said element to bodily raise or lower the motor relative to the slide, and means under the control of an operator for shifting the slide and the motor radially of the disk.

6. The combination with driven mechanism including a friction disk, of a support, a motor slidable thereon, a slide, a lifting element carried by the slide, means for actuating said element to raise or lower the motor relative to the support, a brake member movable with the motor and extending under and close to the disk, and a friction wheel carried by the motor shaft and movable by the motor into and out of contact with the disk.

In testimony that I claim the foregoing as my own, I have hereto affixed my signature.

CHARLES A. RINKER.